(12) United States Patent
Kuwajima et al.

(10) Patent No.: US 11,155,064 B2
(45) Date of Patent: *Oct. 26, 2021

(54) LAMINATE

(71) Applicant: DAIKIN INDUSTRIES, LTD., Osaka (JP)

(72) Inventors: Yuuki Kuwajima, Osaka (JP); Toshiaki Masui, Osaka (JP); Takeshi Inaba, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/136,701

(22) Filed: Sep. 20, 2018

(65) Prior Publication Data

US 2019/0030869 A1   Jan. 31, 2019

Related U.S. Application Data

(63) Continuation of application No. 14/349,859, filed as application No. PCT/JP2012/075969 on Oct. 5, 2012, now Pat. No. 10,252,496.

(30) Foreign Application Priority Data

Oct. 19, 2011   (JP) ................. 2011-229997

(51) Int. Cl.
| | |
|---|---|
| B32B 27/08 | (2006.01) |
| B32B 27/20 | (2006.01) |
| B32B 25/18 | (2006.01) |
| B32B 25/08 | (2006.01) |
| B32B 25/20 | (2006.01) |
| B32B 25/16 | (2006.01) |
| B32B 27/30 | (2006.01) |

(52) U.S. Cl.
CPC ............. *B32B 27/08* (2013.01); *B32B 25/08* (2013.01); *B32B 25/16* (2013.01); *B32B 25/18* (2013.01); *B32B 25/20* (2013.01); *B32B 27/20* (2013.01); *B32B 27/30* (2013.01); *B32B 2262/101* (2013.01); *B32B 2262/106* (2013.01); *B32B 2264/102* (2013.01); *B32B 2264/108* (2013.01); *B32B 2307/202* (2013.01); *B32B 2307/306* (2013.01); *B32B 2307/51* (2013.01); *B32B 2307/54* (2013.01); *B32B 2307/712* (2013.01); *B32B 2605/00* (2013.01); *Y10T 428/31544* (2015.04)

(58) Field of Classification Search
None
See application file for complete search history.

(56) References Cited

U.S. PATENT DOCUMENTS

| | | | |
|---|---|---|---|
| 4,606,952 A | 8/1986 | Sugimoto et al. | |
| 6,482,522 B1 | 11/2002 | Parsonage et al. | |
| 9,809,008 B2 * | 11/2017 | Masui | ........ B32B 7/10 |
| 10,252,496 B2 * | 4/2019 | Kuwajima | ........ B32B 25/08 |
| 2003/0166789 A1 * | 9/2003 | Aimura | ........ C08K 3/34 |
| | | | 525/329.1 |
| 2005/0000582 A1 | 1/2005 | Okado et al. | |
| 2007/0026177 A1 | 2/2007 | Kitahara et al. | |
| 2007/0231522 A1 | 10/2007 | Sakazaki et al. | |
| 2008/0241449 A1 | 10/2008 | Fukaya et al. | |
| 2009/0221751 A1 | 9/2009 | Hasse et al. | |
| 2010/0297452 A1 | 11/2010 | Funayama et al. | |
| 2012/0107617 A1 * | 5/2012 | Masui | ........ B32B 7/10 |
| | | | 428/422 |
| 2013/0236670 A1 * | 9/2013 | Hamaguchi | ........ C08L 63/00 |
| | | | 428/36.8 |

FOREIGN PATENT DOCUMENTS

| | | |
|---|---|---|
| JP | 56-53066 A | 5/1981 |
| JP | H07266501 A | 10/1995 |
| JP | 2001-526972 A | 12/2001 |
| JP | 2001-527104 A | 12/2001 |
| JP | 2003-268329 A | 9/2003 |
| JP | 2005-022403 A | 1/2005 |
| JP | 2007-261079 A | 10/2007 |
| JP | 2010-253728 A | 11/2010 |
| KR | 10-2010-0119869 A | 11/2010 |
| WO | 99/32542 A1 | 7/1999 |
| WO | 99/32557 A1 | 7/1999 |
| WO | 2009/020182 A1 | 2/2009 |
| WO | 2011/001756 A1 | 1/2011 |
| WO | WO-2011001756 A1 * | 1/2011 ............... B32B 7/10 |

OTHER PUBLICATIONS

International Preliminary Report on Patentability dated Apr. 22, 2014, issued by the International Searching Authority in corresponding International Application No. PCT/JP2012/075969.
International Search Report for PCT/JP2012/075969 dated Dec. 25, 2012.

* cited by examiner

*Primary Examiner* — Cheng Yuan Huang
(74) *Attorney, Agent, or Firm* — Sughrue Mion, PLLC

(57) ABSTRACT

A laminate including: a rubber layer (A); and a fluororesin layer (B) laminated on the rubber layer (A), the rubber layer (A) being formed of a rubber composition for vulcanization containing: at least one unvulcanized rubber (a1) selected from acrylonitrile-butadiene rubber and its hydride, styrene-butadiene rubber, chloroprene rubber, butadiene rubber, natural rubber, isoprene rubber, ethylene-propylene-ter-monomer-copolymer rubber, silicone rubber, butyl rubber, and acrylic rubber; at least one compound (a2) selected from 1,8-diazabicyclo(5.4.0)undec-7-ene salts, 1,5-diazabicyclo(4.3.0)-non-5-ene salts, 1,8-diazabicyclo(5.4.0)undec-7-ene, and 1,5-diazabicyclo(4.3.0)-non-5-ene; at least one compound (a3) selected from aldehyde-amine compounds and metal hydrates; magnesium oxide (a4); and silica (a5), the fluororesin layer (B) being formed of a fluoropolymer composition containing a fluoropolymer (b1) having a copolymer unit derived from chlorotrifluoroethylene.

8 Claims, No Drawings

LAMINATE

CROSS REFERENCE TO RELATED APPLICATIONS

This application is a continuation of Ser. No. 14/349,859 filed Apr. 4, 2014, which is a National Stage of International Application of PCT/JP2012/075969 filed Oct. 5, 2012, and claims benefit to Japanese Application 2011-229997, filed Oct. 19, 2011, the contents of each of which are incorporated herein by reference in their entirety.

TECHNICAL FIELD

The present invention relates to a laminate.

BACKGROUND ART

Growing environmental awareness has led to recent improvement in legal systems for controlling the fuel volatilization. Especially in the automotive industry, the fuel volatilization control is seriously demanded particularly in the United States. This demand has raised needs for materials having excellent fuel-barrier properties.

Fuel delivery hoses used are laminated hoses (made of rubber except for a barrier layer) including a barrier layer formed of a fluororesin for lowering the fuel permeability. Recent strong demands for reducing environmental loads have raised needs for lower fuel permeability of the barrier layer. Trials have been made for ensuring lower permeability by increasing the thickness of the barrier layer or using perhalogen fluororesins that has the lowest permeability among fluororesins. Increase in the thickness of the barrier layer (fluororesin) however increases the weight of the resulting hose, leading to a disadvantage from the standpoint of energy conservation. Further, such a hose has poor bendability (flexibility), which is disadvantageous in terms of handleability (assembling property).

In the case where a perhalogen fluororesin is used for a barrier layer, such a barrier layer is not easily adhered to rubber of inner and outer layers. To improve the adhesiveness, a surface treatment on the resin or a treatment of wrapping the layer with a film or tape is needed. As a result, the procedure is complicated to cause practical disadvantages such as significant reduction in productivity and great increase in the cost.

As disclosed in Patent Literature 1, for example, a known means for enhancing the adhesion between a fluororesin layer and a rubber layer is use of epoxidized rubber or a mixture of epoxidized rubber and another rubber for a rubber layer. Moreover, as disclosed in Patent Literature 2, for direct adhesion of a rubber to a fluororesin, a thermoplastic fluororesin having a reactive functional group such as a carbonyl group is used as a fluororesin, and a polyfunctional compound such as triallyl isocyanurate is added to at least one of the thermoplastic fluororesin and a rubber layer.

As disclosed in Patent Literature 3, also known is a fuel hose having a layered structure in which a diene rubber layer and a vinylidene fluoride copolymer (THV) layer are adjacent to each other, the diene rubber layer formed of a diene rubber, such as NBR, blended with a sulfur vulcanizing agent, at least one of a metal calbamate and a thiazole metal salt, and magnesium oxide, together with a DBU salt and the like.

As disclosed in Patent Literatures 4 and 5, the adhesiveness of a curable elastomeric compound to a fluoropolymer layer is known to be enhanced by using fluoropolymers including at least one monomer containing plural hydrogen atoms or fluoropolymers essentially including vinylidene fluoride, with a dehydrofluorinated composition mixed therein.

Patent Literature 6 discloses a laminate including a rubber layer (A), a fluororesin layer (B) on the rubber layer (A), wherein the rubber layer (A) is a layer formed of a rubber composition for vulcanization, the rubber composition for vulcanization containing an unvulcanized rubber (a1), at least one compound (a2) selected from the group consisting of 1,8-diazabicyclo(5.4.0)undec-7-ene, 1,5-diazabicyclo (4.3.0)-non-5-ene salts, 1,8-diazabicyclo(5.4.0)undec-7-ene, and 1,5-diazabicyclo(4.3.0)-non-5-ene, magnesium oxide (a3), and silica (a4), the compound (a2) being contained in an amount of more than 1.0 part by mass but not more than 5.0 parts by mass based on 100 parts by mass of the unvulcanized rubber (a1), the fluororesin layer (B) being a layer formed of a fluoropolymer composition, the fluoropolymer composition containing a fluoropolymer (b1) having a copolymer unit derived from chlorotrifluoroethylene.

CITATION LIST

Patent Literature

Patent Literature 1: JP-A H07-266501
Patent Literature 2: JP-A 2005-22403
Patent Literature 3: JP-A 2007-261079
Patent Literature 4: JP-T 2001-527104
Patent Literature 5: JP-T 2001-526921
Patent Literature 6: WO 2011/001756

SUMMARY OF INVENTION

Technical Problem

The present invention aims to provide a laminate in which a rubber layer and a fluororesin layer are firmly adhered to each other without using an adhesive or performing a surface treatment on each layer of the rubber layer and the fluororesin layer.

Solution to Problem

The present invention relates to a laminate including: a rubber layer (A); and a fluororesin layer (B) laminated on the rubber layer (A), the rubber layer (A) being formed of a rubber composition for vulcanization, the rubber composition for vulcanization containing: at least one unvulcanized rubber (a1) selected from the group consisting of acrylonitrile-butadiene rubber and its hydride, styrene-butadiene rubber, chloroprene rubber, butadiene rubber, natural rubber, isoprene rubber, ethylene-propylene-termonomer-copolymer rubber, silicone rubber, butyl rubber, and acrylic rubber; at least one compound (a2) selected from the group consisting of 1,8-diazabicyclo(5.4.0)undec-7-ene salts, 1,5-diazabicyclo(4.3.0)-non-5-ene salts, 1,8-diazabicyclo(5.4.0) undec-7-ene, and 1,5-diazabicyclo(4.3.0)-non-5-ene; at least one compound (a3) selected from the group consisting of dithiocarbamic acid copper salts, aldehyde-amine compounds, and metal hydrates; magnesium oxide (a4); and silica (a5), the fluororesin layer (B) being formed of a fluoropolymer composition, the fluoropolymer composition containing a fluoropolymer (b1) having a copolymer unit derived from chlorotrifluoroethylene.

Advantageous Effects of Invention

In lamination of a fluororesin layer and a rubber layer of the laminate of the present invention, a chemically firm adhesion is achieved during vulcanization of the rubber without a complicated procedure. A special treatment for adhesion is therefore not needed, enabling easy formation at low cost. Such a laminate is produced by a common method such as extrusion, and therefore, layers can be thinner. In addition, since the amount used of a high-cost fluororesin can be limited, the resulting laminate can be highly flexible.

DESCRIPTION OF EMBODIMENTS

The laminate of the present invention includes a rubber layer (A) and a fluororesin layer (B) laminated on the rubber layer (A).

A description is given on each layer in the following.
(A) Rubber Layer

The rubber layer (A) is a layer formed of a rubber composition for vulcanization.

The rubber composition for vulcanization essentially contains an unvulcanized rubber (a1), a compound (a2), at least one compound (a3) selected from the group consisting of dithiocarbamic acid copper salts, aldehyde-amine compounds, and metal hydrates, magnesium oxide (a4), and silica (a5). The rubber composition for vulcanization containing a metal compound (a3) improves the adhesion strength between the layer (A) and the layer (B), even if the amount of the compound (a2) is small.

The rubber composition for vulcanization may optionally further contain at least one of a vulcanizing agent (a6) and a thiazole metal salt (a7). Especially, in the case where the rubber composition for vulcanization contains, in addition to the unvulcanized rubber (a1) and the compound (a2), a vulcanizing agent (a6) and the thiazole metal salt (a7), the adhesion strength between the layers (A) and (B) is greater.

A fluorine-free rubber is used as the unvulcanized rubber (a1) because of its excellent low-temperature resistance and favorable cost performance.

The fluorine-free rubber is at least one unvulcanized rubber selected from the group consisting of acrylonitrile-butadiene rubber (NBR) and its hydride (HNBR), styrene-butadiene rubber (SBR), chloroprene rubber (CR), butadiene rubber (BR), natural rubber (NR), isoprene rubber (IR), ethylene-propylene-termonomer-copolymer rubber, silicone rubber, butyl rubber, and acrylic rubber.

Exemplary termonomers of the ethylene-propylene-termonomer-copolymer rubber include monomers in a diene rubber such as natural rubber, butadiene rubber (BR), isoprene rubber, butyl rubber, and chloroprene rubber.

The unvulcanized rubber (a1) is preferably a diene rubber because it is excellent in the heat resistance, oil resistance, weather resistance, and extrudability. More preferred is NBR or HNBR. NBR and HNBR may be used in combination.

The rubber composition for vulcanization may contain a resin for imparting the rubber layer (A) with properties different from those of the unvulcanized rubber (a1). Examples of the resin include PVC, chlorinated polystyrene, chlorosulfonated polystyrene ethylene, ethylene-vinyl acetate copolymers. For example, in the case where the rubber composition for vulcanization contains NBR and PVC, the ozone resistance is improved. In such a case the amount added of PVC is preferably 10 to 70 parts by mass based on 100 parts by mass of NBR.

The compound (a2) is at least one compound selected from the group consisting of 1,8-diazabicyclo(5.4.0)undec-7-ene salts (DBU salts), 1,5-diazabicyclo(4.3.0)-non-5-ene salts (DBN salts), 1,8-diazabicyclo(5.4.0)undec-7-ene (DBU), and 1,5-diazabicyclo(4.3.0)-non-5-ene (DBN). The compound (a2) contained improves the vulcanization properties of the rubber composition for vulcanization.

Examples of the DBU salts and DBN salts include carbonates, long chain aliphatic carboxylates, aromatic carboxylates, orthophthalates, p-toluene sulfonates, phenolates, phenolic resin salts, naphthoates, octylates, oleates, formates, and phenol novolac resin salts thereof. More preferred is at least one compound selected from the group consisting of 1,8-benzyl-1,8-diazabicyclo(5.4.0)-7-undecenium chloride (DBU-B), naphthoates, orthophthalates, phenolates, and formates thereof.

More specifically, the compound (a2) is at least one compound selected from the group consisting of DBU, DBU-B, DBU naphtoate, DBU phenolate, DBU orthophthalate, and DBU formate.

The compound (a2) is more preferably at least one compound selected from the group consisting of DBU, DBU-B, DBU phenolate, DBU orthophthalate, and DBU formate. Still more preferred is at least one compound selected from the group consisting of DBU-B and DBU formate, and particularly preferred is DBU formate.

Preferably, the compound (a2) essentially contains DBU formate. The compound (a2) may contain DBU formate alone. Preferably, the compound (a2) contains DBU formate and DBU-B in combination, DBU formate and DBU phenolate in combination, DBU formate and DBU orothophthalate in combination, DBU formate and DBU in combination, or DBU formate and DBU naphthoate in combination.

The amount of the compound (a2) is preferably at least 0.1 part by mass based on 100 parts by mass of the unvulcanized rubber (a1). The amount of the compound (a2) is more preferably at least 0.2 part by mass based on 100 parts by mass of the unvulcanized rubber (a1). If the amount of the compound (a2) is too small, the adhesivness may be insufficient.

From the standpoint of reducing the cost of rubber without lowering the compression set and rubber hardness after vulcanization, the amount of the compound (a2) is preferably at most 5.0 parts by mass and more preferably at most 3.0 parts by mass based on 100 parts by mass of the unvulcanized rubber (a1). From the standpoint of reducing the cost, the amount is also preferably at most 1.0 part by mass.

The compound (a3) is at least one compound selected from the group consisting of dithiocarbamic acid copper salts, aldehyde-amine compounds, and metal hydrates. The rubber composition for vulcanization containing the compound (a3) improves the adhesion strength between the layers (A) and (B) even if the amount added of the compound (a2) is small as 0.2 part by mass.

Examples of the dithiocarbamic acid copper salts include dimethyl dithiocarbamate copper salt (CuMDC), and diethyl dithiocarbamate copper salt (CuEDC). Each of these may be used alone, or two or more of these may be used in combination. In particular, CuMDC is preferred in terms of adhesiveness and rubber properties.

Examples of the metal hydrate include a hydrate of at least one metal selected from copper, zinc, aluminum, cobalt, calcium, zirconium, nickel, and magnesium. Specific examples thereof include $CuSO_4 \cdot 5H_2O$, $ZnSO_4 \cdot H_2O$, $ZnSO_4 \cdot 7H_2O$, $AlCl_3 \cdot 6H_2O$, n-hydrate of aluminum silicate, $(Al(NO_3)_3 \cdot 9H_2O)$, 1.5-, 2-, 4-, and 6-hydrates of $CoCl_2$, 2-, 4- and 6-hydrates of $CaCl_2$, calcium silicate hydrates, calcium sulfate hydrates, 8-hydrate of zirconium oxychloride, 2-hydrate of zirconium oxynitrate, zirconium dioxide hydrates, 6-hydrate of nickel sulfate, 6-hydrate of nickel nitrate, 6-hydrate of nickel chloride, magnesium sulfate hydrates, magnesium fluoride hydrates, 6-hydrate of magnesium chloride, $CaSO_4.5H_2O$, $CaSO_4.2H_2O$, and 1-hydrate of calcium acetate. The metal hydrate is preferably at least one hydrate selected from the group consisting of $CaSO_4.2H_2O$ and 1-hydrate of calcium acetate, and is more preferably 1-hydrate of calcium acetate.

The aldehyde-amine compound is preferably at least one selected from the group consisting of n-butyl aldehyde aniline, acetaldehyde aniline, butyl aldehyde acetaldehyde aniline, butyl aldehyde monobutylamine, butyl aldehyde butylidene aniline, formaldehyde acetaldehyde aniline, and aldehyde amine. The aldehyde-amine compound is more preferably n-butyl aldehyde aniline.

As the compound (a3), each of the dithiocarbamic acid copper salt, metal hydrate, and aldehyde-amine compound may be used alone, or two or more of these may be used in combination. From the standpoint of improving the adhesiveness, a combination use thereof is preferable.

From the standpoint of maintaining moderate vulcanization, the compound (a3) is preferably at least one compound selected from the group consisting of aldehyde-amine compounds and metal hydrates, and is more preferably a metal hydrate.

In terms of quick vulcanization, the compound (a3) is preferably at least one compound selected from the group consisting of dithiocarbamic acid copper salts and metal hydrates.

From the standpoint of improving the adhesiveness without increasing the cost, both the dithiocarbamic acid copper salt and the metal hydrate are preferably used as the compound (a3).

The amount of the compound (a3) is preferably at least 0.1 part by mass, more preferably at least 0.3 part by mass, and still more preferably at least 1.0 part by mass based on 100 parts by mass of the unvulcanized rubber (a1). If the amount of the compound (a3) is too small, the adhesiveness may be insufficient.

In terms of the cost, the amount of the compound (a3) is preferably at most 35.0 parts by mass, more preferably at most 25.0 parts by mass, and still more preferably at most 23.0 parts by mass, based on 100 parts by mass of the unvulcanized rubber (a1).

The amount of the dithiocarbamic acid copper salt is preferably at least 0.1 part by mass, more preferably at least 0.3 part by mass, and still more preferably at least 1.0 part by mass based on 100 parts by mass of the unvulcanized rubber (a1). If the amount of the dithiocarbamic acid copper salt is too small, the adhesiveness may be insufficient.

In terms of the cost, the amount of the dithiocarbamic acid copper salt is preferably at most 5.0 parts by mass and more preferably at most 3.0 parts by mass based on 100 parts by mass of the unvulcanized rubber (a1).

The amount of the aldehyde-amine compound is preferably at least 0.1 part by mass, more preferably at least 0.3 part by mass, and still more preferably at least 1.0 part by mass based on 100 parts by mass of the unvulcanized rubber (a1). If the amount of the aldehyde-amine compound is too small, the adhesiveness may be insufficient.

In terms of the cost, the amount of the aldehyde-amine compound is preferably at most 5.0 parts by mass and more preferably at most 3.0 parts by mass based on 100 parts by mass of the unvulcanized rubber (a1).

The amount of the metal hydrate is preferably at least 1.0 part by mass and more preferably at least 5.0 parts by mass based on 100 parts by mass of the unvulcanized rubber (a1). If the amount of the metal hydrate is too small, the adhesiveness may be insufficient. From the standpoint of increasing the hardness, the amount is preferably at least 5.0 parts by mass.

In terms of the cost, the amount of the metal hydrate is preferably at most 30.0 parts by mass and more preferably at most 20.0 parts by mass based on 100 parts by mass of the unvulcanized rubber (a1).

In terms of the adhesiveness and rubber properties, the amount added of the magnesium oxide (a4) is preferably 3 to 20 parts by mass and particularly preferably 5 to 15 parts by mass based on 100 parts by mass of the unvulcanized rubber (a1). The laminate having a specific structure of the present invention is allowed to have excellent adhesiveness by essentially containing the magnesium oxide (a4).

As the silica (a5), basic silica and acidic silica may be used. In terms of the adhesiveness, basic silica is preferably used. Examples of the basic silica include Carplex 1120 (DSL Japan Co., Ltd.). In terms of the adhesiveness and rubber properties, the amount added of the silica (a5) is preferably 10 to 40 parts by mass and particularly preferably 15 to 25 parts by mass based on 100 parts by mass of the unvulcanized rubber (a1). The laminate having a specific structure of the present invention is allowed to have excellent adhesiveness by essentially containing the silica (a5).

The vulcanizing agent (a6) may be a conventionally known one selected in accordance with the vulcanizing system of the rubber composition for vulcanization. Vulcanization of the unvulcanized rubber (a1) improves the mechanical strength, such as tensile strength, of a vulcanized rubber layer to be obtained, and also provides favorable elasticity of the rubber layer.

The vulcanizing system employed in the present invention may be sulfur vulcanizing system, polyamine vulcanizing system, polyol vulcanizing system, peroxide vulcanizing system, imidazole vulcanizing system, triazine vulcanizing system, oxazole vulcanizing system, or thiazole vulcanizing system. The vulcanizing system may be appropriately selected in accordance with, in the case where the unvulcanized rubber includes a vulcanizable group (cure site), the kind of the cure site, and also in accordance with the properties to be given to the vulcanized laminate and applications thereof.

The vulcanizing agent (a6) may be a sulfur vulcanizing agent, polyamine vulcanizing agent, polyol vulcanizing agent, peroxide vulcanizing agent, imidazole vulcanizing agent, triazine vulcanizing agent, oxazole vulcanizing agent, or thiazole vulcanizing agent in accordance with the selected vulcanizing system. Each of these may be used alone, or two or more of these may be used in combination.

In the case where the unvulcanized rubber (a1) is a diene-type fluorine-free diene rubber (e.g., NBR, SBR, BR), the sulfur vulcanizing system or peroxide vulcanizing system is commonly employed. Therefore, a vulcanizing agent used is preferably at least one selected from the group consisting of sulfur vulcanizing agents and peroxide vulcanizing agents.

Examples of the sulfur vulcanizing agents include powdered sulfur, precipitated sulfur, colloidal sulfur, surface-treated sulfur, insoluble sulfur, sulfur chloride, sulfur dichloride, disulfide compounds, and polysulfide compounds.

The amount added of the sulfur vulcanizing agent is preferably 1.0 to 10.0 parts by mass based on 100 parts by mass of the unvulcanized rubber (a1). If the amount is too small, the adhesiveness may be insufficient. If the amount is too large, in contrast, the resulting rubber may be too rigid.

Preferable peroxide vulcanizing agent is an organic peroxide easily generating peroxy radicals in the presence of heat or a redox system.

Examples of the organic peroxide include 1,1-bis(t-butylperoxy)-3,5,5-trimethyl cyclohexane, 2,5-dimethylhexane-2,5-dihydroxy peroxide, di-t-butyl peroxide, t-butyl cumyl peroxide, dicumyl peroxide, α,α'-bis(t-butylperoxy)-p-diisopropylbenzene, 2,5-dimethyl-2,5-di(t-butylperoxy) hexane, 2,5-dimethyl-2,5-di(t-butylperoxy)hexyne-3, benzoylperoxide, t-butyl peroxybenzene, 2,5-dimethyl-2,5-di (benzoylperoxy)hexane, t-butylperoxymaleic acid, and t-butylperoxy isopropyl carbonate. Particularly preferred are dialkyl compounds.

The kind and amount added of the vulcanizing agent is commonly determined in accordance with the amount of active —O=O— and the degradation temperature and the like. The amount added is commonly 0.1 to 15.0 parts by mass and preferably 0.3 to 5.0 parts by mass based on 100 parts by mass of the unvulcanized rubber.

The vulcanizing agent (a6) is preferably at least one selected from the group consisting of sulfur vulcanizing agents and peroxide vulcanizing agents, and is more preferably a sulfur vulcanizing agent. The amount added thereof is preferably 0.5 to 5.0 parts by mass, and more preferably 1.0 to 3.0 parts by mass based on 100 parts by mass of the unvulcanized rubber (a1).

Zinc mercaptobenzothiazole (ZnMBT) is preferably used as the thiazole metal salt (a7).

The amount added of the thiazole metal salt (a7) is preferably 0.01 to 3.0 parts by mass, more preferably 0.01 to 0.5 part by mass, and still more preferably 0.05 to 0.3 part by mass based on 100 parts by mass of the unvulcanized rubber (a1). If the amount added of the thiazole metal salt (a7) is too small, the vulcanized rubber may have poor properties. If the amount is too large, the unvulcanized rubber may have poor properties.

The rubber composition for vulcanization preferably contains no amine compound because it may inhibit the vulcanizing properties and impair rubber properties.

In the present invention, additives commonly used for rubber compositions for vulcanization may be added in accordance with purposes and needs. Examples of the additives include fillers, processing aids, plasticizers, softeners, age inhibitors, colorants, stabilizers, adhesion aids, mold release agents, conductivity imparting agents, thermal conductivity imparting agents, anti-tackifiers for surfaces, tackifiers, flexibility imparting agents, heat resistance improvers, flame retardants, UV absorbers, oil resistance improvers, blowing agents, antiscorching agents, lubricants, and epoxy resins. Further, one or two or more common vulcanizing agents or vulcanization accelerators other than the above mentioned agents may be added. Here, the amount of these additives should be within the range that would not deteriorate the adhesiveness of the fluororesin layer (B) which is intended to be improved in the present invention.

Examples of the fillers include: metal oxides such as calcium oxide, titanium oxide, and aluminum oxide; metal hydroxides such as magnesium hydroxide, aluminum hydroxide, and calcium hydroxide; carbonates such as magnesium carbonate, aluminum carbonate, calcium carbonate, and barium carbonate; silicates such as magnesium silicate, calcium silicate, sodium silicate, and aluminum silicate; sulfates such as aluminum sulfate, calcium sulfate, and barium sulfate; synthesized hydrotalcite; metal sulfides such as molybdenum disulfide, iron sulfide, and copper sulfide; diatom earth, asbestos, lithopone (zinc sulfide/barium sulfide), graphite, carbon black, carbon fluoride, calcium fluoride, coke, quartz fine powder, zinc flower, talc, mica powder, wollastonite, carbon fiber, alamido fiber, various whiskers, glass fiber, organic stiffeners, and organic fillers.

Examples of the processing aids include: higher fatty acids such as stearic acid, oleic acid, palmitic acid, and lauric acid; higher fatty acid salts such as sodium stearate and zinc stearate; higher fatty acid amides such as stearic amide and oleic amide; higher fatty acid esters such as ethyl oleate; higher fatty amines such as stearylamine and oleylamine; petroleum waxes such as carnauba wax and ceresin wax; polyglycols such as ethylene glycol, glycerol, and diethylene glycol; aliphatic hydrocarbons such as vaseline and paraffin; silicone oils, silicone polymers, low molecular weight polyethylene, phthalate esters, phosphate esters, rosin, (halogenated) dialkyl amines, (halogenated) dialkyl sulfones, and surface active agents.

Examples of the plasticizers include phthalic acid derivatives, sebacic acid derivatives, and adipic acid derivatives. Examples of the softeners include lubricant oil, process oil, coal tar, castor oil, and calcium stearate. Examples of the age inhibitors include phenylenediamines, phosphates, quinolines, cresols, phenols, and dithiocarbamate metal salts.

Examples of the epoxy resins include bisphenol A-type epoxy resins, bisphenol F-type epoxy resins, and polyfunctional epoxy resins. Among these, the bisphenol A-type epoxy resins are preferable as they are excellent in chemical resistance and adhesiveness. Further, the epoxy resin represented by Formula (1):

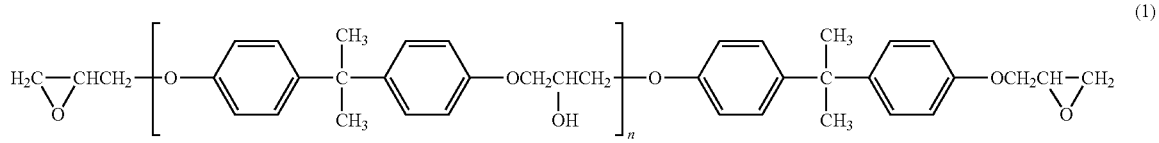

(1)

is particularly preferable. In Formula (1), n is the average value and is preferably 0.1 to 3, more preferably 0.1 to 0.5, and still more preferably 0.1 to 0.3. If n is less than 0.1, the adhesiveness with the fluororesin (b) tends to be lowered. If n exceeds 3, the viscosity of the epoxy resin itself increases and such an epoxy resin may be hardly uniformly dispersed in the rubber composition for vulcanization.

In a case where an epoxy resin is added, the amount thereof is preferably not less than 1 part by mass, more preferably not less than 2 parts by mass, and particularly preferably 3 parts by mass, based on 100 parts by mass of the unvulcanized rubber in order to further improve the adhesiveness with the fluororesin (b). From the standpoint of avoiding a too-hard rubber layer, the amount is preferably not more than 25 parts by mass, more preferably not more than 15 parts by mass, and particularly preferably not more than 10 parts by mass, based on 100 parts by mass of the unvulcanized rubber.

The rubber composition for vulcanization is prepared by compounding the unvulcanized rubber (a1), the compound (a2), the compound (a3), the magnesium oxide (a4), and the silica (a5), and optionally with the vulcanizing agent (a6), the thiazole metal salt (a7) and other additives.

Compounding is performed, for example, using an open roll mill, Banbury mixer, or pressurizing kneader at a temperature of not higher than 100° C.

The optimal vulcanizing time ($T_{90}$) of the rubber composition for vulcanization is preferably not longer than 18 minutes. The optimal vulcanizing time ($T_{90}$) is more preferably not longer than 15 minutes, more preferably not longer than 13 minutes, and particularly preferably not longer than 11 minutes. The lower limit of $T_{90}$ is not particularly limited, and may be not shorter than one minute, for example. The rubber composition for vulcanization having a composition as described above can shorten the vulcanization time and improve the productivity. $T_{90}$ is a value obtained by measuring the maximum torque value ($M_H$) and the minimum torque value ($M_L$) at 160° C. and using a formula $\{(M_H)-(M_L)\}\times 0.9+M_L$. Here, $M_H$ and $M_L$ are measured in conformity with JIS K 6300-2.

Next, the fluororesin layer (B) in the laminate of the present invention is described.

(B) Fluororesin Layer

The fluororesin layer (B) is formed of a fluoropolymer composition.

The fluoropolymer composition at least contains a fluoropolymer (b1) having a copolymer unit derived from chlorotrifluoroethylene.

The fluoropolymer (b1) is preferably a fluororesin. More specifically, the fluoropolymer (b1) is preferably at least one selected from the group consisting of polychlorotrifluoroethylene (PCTFE) and CTFE copolymers.

The CTFE copolymer preferably contains a copolymer unit derived from CTFE (CTFE unit) and a copolymer unit derived from at least one monomer selected from the group consisting of tetrafluoroethylene (TFE), hexafluoropropylene (HFP), perfluoro(alkylvinylether) (PAVE), vinylidene fluoride (VdF), vinyl fluoride, hexafluoroisobutene, a monomer represented by the formula:

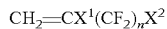

$$CH_2=CX^1(CF_2)_nX^2$$

(in the formula, X' representing H or F, $X^2$ representing H, F, or Cl, and n representing an integer of 1 to 10), ethylene, propylene, 1-butene, 2-butene, vinyl chloride, and vinylidene chloride.

The CTFE copolymer more preferably contains a CTFE unit and a copolymer unit derived from at least one monomer selected from the group consisting of TFE, HFP, and PAVE. Further, the CTFE copolymer still more preferably substantially contains only these copolymer units. In terms of lower fuel permeability, it is preferable that the CTFE copolymer does not contain a monomer having a CH bond such as ethylene, vinylidene fluoride, and vinyl fluoride. Commonly, a perhalopolymer is hardly adhered to rubber. In accordance with the structure of the present invention, however, adhesion between the fluororesin layer and the rubber layer is strong even when the fluororesin layer is formed of perhalopolymers.

The CTFE copolymer preferably has the CTFE unit in an amount of 10 to 90 mol % of all the monomer units.

The CTFE copolymer particularly preferably contains a CTFE unit, a TFE unit, and a monomer (α) unit derived from a monomer (α) copolymerizable with the above units.

The "CTFE unit" and the "TFE unit" are a part derived from CTFE (—CFCl—$CF_2$—) and a part derived from TFE (—$CF_2$—$CF_2$—), respectively, in the molecular structure of the CTFE copolymer. Similarly, the "monomer (α) unit" is a part where a monomer (α) is added in the molecular structure of the CTFE-based copolymer.

The monomer (α) is not particularly limited as long as it is a monomer copolymerizable with CTFE and TFE. Examples thereof include ethylene (Et), vinylidene fluoride (VdF), perfluoro(alkylvinylether) (PAVE) represented by $CF_2=CF—ORf^1$ (in the formula, $Rf^1$ representing a C1-C8 perfluoroalkyl group), a vinyl monomer represented by $CX^3X^4=CX^5(CF_2)_nX^6$ (in the formula, $X^3$, $X^4$, and $X^5$ being the same as or different from one another and representing a hydrogen atom or fluorine atom, $X^6$ being a hydrogen atom, fluorine atom, or chlorine atom, and n representing an integer of 1 to 10), and an alkyl perfluoro vinylether derivative represented by $CF_2=CF—OCH_2—Rf^2$ (in the formula, $Rf^2$ representing a C1-C5 perfluoroalkyl group). Among these, the monomer (α) is preferably at least one selected from the group consisting of PAVE, the vinyl monomer, and the alkyl perfluoro vinylether derivative. More preferably, the monomer (α) is at least one selected from the group consisting of PAVE and HFP.

The alkyl perfluoro vinylether derivative preferably has $Rf^2$ representing a C1-C3 perfluoroalkyl group. More preferably, the alkyl perfluoro vinylether derivative is $CF_2=CF—OCH_2—CF_2CF_3$.

The ratio between the CTFE unit and the TFE unit in the CTFE copolymer is CTFE unit/TFE unit=15-90/85-10 (mol %). More preferably, the ratio is CTFE unit/TFE unit=20-90/80-10 (mol %). Still more preferably, the ratio is CTFE unit/TFE unit=15-25/85-75 (mol %).

In the CTFE copolymer, preferably, the total amount of the CTFE unit and the TFE unit is 90 to 99.9 mol % and the amount of the monomer (α) unit is 0.1 to 10 mol %. If the amount of the monomer (α) unit is less than 0.1 mol %, the fluoropolymer composition tends to have poor formability, environmental stress crack resistance, and fuel crack resistance. In contrast, if the amount of the monomer (α) unit is more than 10 mol %, the fluororesin layer (B) tends to have insufficiently low fuel permeability, and have poor heat resistance, and mechanical properties.

The fluoropolymer (b1) is most preferably PCTFE or a CTFE-TFE-PAVE copolymer. The CTFE-TFE-PAVE copolymer is a copolymer consisting substantially only of CTFE, TFE, and PAVE. PCTFE and the CTFE-TFE-PAVE copolymer each have no hydrogen atom directly bonded to a carbon atom constituting a main chain so that dehydrofluorination reaction does not progress. Accordingly, a conventional method for improving the adhesiveness cannot be employed which utilizes an unsaturated bond formed in the fluoropolymer by dehydrofluorination reaction. In the present invention, the rubber layer (A) is a layer formed of a fluororubber composition for vulcanization having a predetermined composition. Therefore, adhesion between the layer (A) and the layer (B) is strong even when the fluororesin layer (B) is formed of the CTFE-TFE-PAVE copolymer.

Examples of the PAVE include perfluoro(methylvinylether) (PMVE), perfluoro(ethylvinylether) (PEVE), perfluoro(propylvinylether) (PPVE), and perfluoro(butylvinylether). Among these, the PAVE is preferably at least one selected from the group consisting of PMVE, PEVE, and PPVE.

The amount of the PAVE unit is preferably not smaller than 0.5 mol % and not larger than 5 mol % of all the monomer units.

The constitutional units such as a CTFE unit are quantified by $^{19}$F-NMR analysis.

The fluoropolymer (b1) may have at least one reactive functional group selected from the group consisting of carbonyl, hydroxy, heterocyclic, and amino groups, at a main chain terminal and/or a side chain of the polymer.

In the present description, "carbonyl group" is a divalent carbon group constituted by a carbon-oxygen double bond and is exemplified by a group represented by —C(=O)—. The reactive functional group such as the carbonyl group is not particularly limited, and examples thereof include a group containing a carbonyl group as a part of the chemical structure, such as a carbonate group, a carboxylic halide group (halogenoformyl group), a formyl group, a carboxyl group, an ester bond (—C(=O)O—), an acid anhydride bond (—C(=O)O—C(=O)—), an isocyanate group, an amide group, an imide group (—C(=O)—NH—C(=O)—), an urethane bond (—NH—C(=O)O—), a carbamoyl group ($NH_2$—C(=O)—), a carbamoyloxy group ($NH_2$—C(=O)O—), an ureide group ($NH_2$—C(=)—NH—), and an oxamoyl group ($NH_2$—C(=O)—C(=O)—).

In a group such as an amide group, an imide group, a urethane bond, a carbamoyl group, a carbamoyloxy group, an ureide group, and an oxamoyl group, a hydrogen atom bonded to a nitrogen atom may be substituted by a hydrocarbon group such as an alkyl group.

Preferable examples of the reactive functional group include an amide group, a carbamoyl group, a hydroxy group, a carboxyl group, a carbonate group, a carboxylic halide group, and an acid anhydride bond, because they can be easily introduced and the fluoropolymer (b1) is allowed to have appropriate heat resistance and fine adhesiveness at comparatively low temperature. Further, the reactive functional group is more preferably an amide group, carbamoyl group, hydroxy group, carbonate group, carboxylic halide group, or acid anhydride bond.

Especially, one containing a carbonate group and/or a carboxylic halide group disclosed in WO 99/45044 is particularly preferable.

The fluoropolymer (b1) may be a polymer having a reactive functional group at either a main chain terminal or a side chain, or a polymer having a reactive functional group at both a main chain terminal and a side chain. In the case where the reactive functional group is at the main chain terminal, both terminals of the main chain may have the reactive functional groups or only one terminal may have the reactive functional group. In the case where the reactive functional group has an ether bond, the reactive functional group may be additionally contained in the main chain.

The fluoropolymer (b1) is preferably a polymer having a reactive functional group at a main chain terminal, because such a polymer does not significantly deteriorate the mechanical properties and chemical resistance or because it is advantageous in terms of productivity and cost.

The number of the reactive functional groups may be appropriately determined in accordance with the kind, shape, purpose of adhesion, application, required adhesiveness of the rubber layer to be laminated, and a method of adhering the rubber layer to an adjacent layer.

The number of the reactive functional groups at a main chain terminal and/or a side chain terminal is preferably 3 to 800 for each $1 \times 10^6$ of carbon atoms in the main chain. If the number is smaller than 3, the adhesiveness may be lowered. The lower limit is more preferably 15, still more preferably 30, and particularly preferably 120. The upper limit thereof is preferably 200, for example, in terms of productivity.

The number of the reactive functional groups at the terminal is obtained by the following procedure. The fluoropolymer (b1) in powder form is compression-formed at a forming temperature that is 50° C. higher than the melting point of the fluoropolymer (b1) and at a forming pressure of 5 MPa to give a film sheet having a thickness of 0.25 to 0.30 mm. The infrared absorption spectrum of the film sheet is obtained by using an infrared spectrophotometer. The obtained infrared absorption spectrum is compared with that of a known film so that the characteristic absorption of the reactive functional group is determined. The number of the reactive functional groups at the terminal can be calculated based on each difference spectrum using the following formula.

The number of terminal groups (for each $1 \times 10^6$ of carbon atoms)=$(I \times K)/t$ I: absorption of light
K: correction factor
t: film thickness (mm)
Table 1 shows the correction factors of the terminal reactive functional groups as targets.

TABLE 1

| Terminal group | Absorption frequency (cm$^{-1}$) | Correction factor |
|---|---|---|
| —OC(=O)O—R | 1817 | 1426 |
| —COF | 1884 | 405 |
| —COOH | 1813, (1795-1792), 1775 | 455 |
| —COOCH3 | 1795 | 355 |
| —CONH$_2$ | 3438 | 408 |
| —CH$_2$OH | 3648 | 2325 |

The correction factors shown in Table 1 are determined based on the infrared absorption spectrum of a model compound for determining the number of terminal groups for each $1 \times 10^6$ of carbon atoms in the main chain.

A method for introducing the reactive functional group to the terminal of the main chain and/or the side chain may be a method in which a monomer (β) containing a reactive functional group is copolymerized and introduced, a method utilizing as a polymerization initiator a compound having or generating a reactive functional group, a method utilizing as a chain transfer agent a compound having or generating a reactive functional group, a method of introducing a reactive functional group to a fluoropolymer by a polymer reaction, and a method using these methods in combination.

The monomer (β) containing a reactive functional group in the case where a reactive functional group is introduced by copolymerization is not particularly limited, as long as it is a monomer copolymerizable with a monomer to be a part of a fluoropolymer (b1) and has the reactive functional group. Specifically, the following monomers may be exemplified.

First example of the monomer (β) is aliphatic unsaturated carboxylic acids disclosed in WO 2005/100420. The unsaturated carboxylic acids preferably contain at least one polymerizable carbon-carbon unsaturated bond in the molecule and at least one carbonyl oxy group (—C(=O)—O—) in the molecule.

The aliphatic unsaturated carboxylic acid may be an aliphatic unsaturated monocarboxylic acid or an aliphatic unsaturated polycarboxylic acid having two or more carboxyl groups. Examples thereof include C3-C6 unsaturated aliphatic monocarboxylic acids such as (meth)acrylic acids and crotonic acid.

Examples of the aliphatic unsaturated polycarboxylic acids include C3-C6 unsaturated aliphatic polycarboxylic acids such as maleic acid, fumaric acid, itaconic acid, citraconic acid, measaconic acid, aconitic acid, maleic anhydride, itaconic anhydride and citraconic anhydride.

Second example of the monomer (β) is an unsaturated compound represented by the formula:

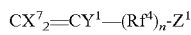

(in the formula, $Z^1$ representing the reactive functional group; $X^7$ and $Y^1$ being the same as or different from each other and each representing a hydrogen atom or fluorine atom; $Rf^4$ representing a C1-C40 alkylene group, C1-C40 fluorooxyalkylene group, C2-C40 fluoroalkylene group having an ether bond, or C2-C40 fluorooxyalkylene group having an ether bond; n representing 0 or 1).

The amount of the reactive functional group-containing monomer (β) to be introduced by copolymerization is preferably not smaller than 0.05 mol %, and more preferably not smaller than 0.1 mol %. If the amount is too large, gelation or vulcanization reaction may easily occur during melting by heating. Therefore, the upper limit of the amount is preferably 5 mol % and more preferably 3 mol %.

The fluoropolymer (b1) may have a heterocyclic group or amino group at a main chain terminal or a side chain terminal of the polymer.

The heterocyclic group is a group having a hetero atom (e.g. nitrogen atom, sulfur atom, oxygen atom) in a ring of the heterocyclic moiety. The ring may be a saturated ring or unsaturated ring, and may be a monocycle or fused ring. Especially, the heterocyclic group is preferably an oxazolyl group.

The amino group is a monovalent functional group obtained by removing hydrogen from ammonium, or a primary or secondary amine. Specifically, the amino group is represented by a formula:

(in the formula, $R^4$ and $R^5$ being the same as or different from each other and each representing a hydrogen atom or a C1-C20 monovalent organic group). Specific examples of the amino group include —$NH_2$, —$NH(CH_3)$, —$N(CH_3)_2$, —$NH(CH_2CH_3)$, —$N(C_2H_5)_2$, and —$NH(C_6H_5)$.

The fluoropolymer (b1) is obtainable by a conventionally known polymerization method such as suspension polymerization, solution polymerization, emulsion polymerization, and bulk polymerization. In the polymerization, various conditions such as temperature and pressure, and the polymerization initiator and other additives may be appropriately determined in accordance with the composition or the amount of the fluoropolymer (b1).

The melting point of the fluoropolymer (b1) is not particularly limited, and is preferably 160° C. to 270° C.

The melting point of the fluoropolymer (b1) is obtained as a temperature corresponding to the maximum value in the melting heat curve measured at a temperature rise of 10° C./min. using a DSC device (product of Seiko Instruments Inc.). The MFR is obtained by measuring the weight (g) of the polymer exiting from the nozzle having a diameter of 2 mm and a length of 8 mm in a unit time (10 minutes) under a load of 5 kg at various temperatures with use of a melt indexer (product of TOYO SEIKI SEISAKU-SHO, LTD.).

The molecular mass of the fluoropolymer (b1) is preferably within a range that allows the obtained molded products to have fine mechanical properties and lower fuel permeability. For example, in the case where the melt flow rate (MFR) is set as an index of the molecular mass, the MFR is preferably 0.5 to 100 g/10 min. at an optional temperature within a range of about 230° C. to 350° C. which is a range of the common forming temperature of the fluoropolymers.

Examples of the polymerization initiator include: oil-soluble radical polymerization initiators represented by peroxy carbonates such as diisopropyl peroxydicarbonate (IPP), di-n-propyl peroxydicarbonate (NPP); and water-soluble radical polymerization initiators such as ammonium, potassium, or sodium salts of persulfuric acid, perboric acid, perchloric acid, perphosphoric acid, and percarbonate. In particular, di-n-propyl peroxydicarbonate (NPP) is preferable.

The chain transfer agent is preferably at least one selected from the group consisting of C1-C4 water-soluble alcohols, C1-C4 hydrocarbons or fluorocarbons, and persulfuric acid salts in terms of favorable dispersibility and uniformity in the reaction system. The chain transfer agent is more preferably at least one selected from the group consisting of methane, ethane, n-butane, isobutane, methanol, n-propylalcohol, HFC-134a, HFC-32, DSP, APS and KPS. The chain transfer agent is still more preferably at least one selected from the group consisting of n-propylalcohol, methanol, and isobutane.

The fluororesin layer (B) in the present invention may contain one of these fluoropolymers (b1) or two or more of these fluoropolymers (b1).

In the case where the laminate of the present invention is used as a material for the fuel field, the fluororesin layer (B) in the laminate preferably has a fuel permeability coefficient of 10 g·mm/m²/day or less, more preferably 1.0 g·mm/m²/day or less, and still more preferably 0.5 g·mm/m²/day or less.

The fuel permeability coefficient is obtained by the following procedure. A sheet made of a resin to be measured is placed in a cup for the fuel permeability coefficient measurement containing a mixed solvent of isooctane:toluene:ethanol=45:45:10 (volume ratio). The mass change is measured at 60° C. Based on the measured value, the fuel permeability coefficient is calculated.

In the present invention, the fluoropolymer (b1) having a specific reactive functional group at the terminal improves the adhesion of the fluororesin layer (B) with the rubber layer (A). Accordingly, it is possible to provide molded products (e.g. fuel tank) having excellent impact resistance and strength.

In the case of being a perhalopolymer, the fluoropolymer (b1) has more excellent chemical resistance and lower fuel permeability. The perhalopolymer is a polymer in which halogen atoms are bonded to all the carbon atoms constituting the main chain of the polymer.

In accordance with purposes and applications, the fluororesin layer (B) may further contain various fillers such as inorganic powder, glass fibers, carbon powder, carbon fibers, and metal oxides, as far as they do not impair the performance.

For example, with an aim of further lowering the fuel permeability, the fluororesin layer (B) may contain smectite layered clay minerals, such as montmorillonite, beidellite, saponite, nontronite, hectorite, sauconite, and stevensite, and/or fine layered minerals having high aspect ratio such as mica.

With an aim of providing conductivity, conductive filler may be added. The conductive filler is not particularly limited, and examples thereof include a powdery or fibrous conductive elementary substance such as metals and carbons, powder of conductive compounds such as zinc oxide, and powder provided with electric conductivity by a surface treatment. In the case where conductive filler is added, the fluoropolymer composition is preferably molten and compounded and formed into a pellet in advance.

The powdery or fibrous conductive elementary substance is not particularly limited, and examples thereof include: metal powders of copper and nickel; metal fibers of iron and stainless steel; carbon black, carbon fibers, and carbon fibrils disclosed in JP-A 3-174018.

The powder provided with electric conductivity by a surface treatment is a powder obtained by conducting treatment for imparting the conductivity to the surface of a nonconductive powder such as glass beads and titanium oxide.

The method of imparting the conductivity to the surface is not particularly limited, and may be metal sputtering, electroless deposition, or the like.

Carbon black, among the conductive fillers, is favorably used because it is advantageous in terms of the economic efficiency and prevention of static charge build-up.

The volume resistivity of the fluoropolymer composition containing a conductive filler is preferably $1 \times 10^0$ to $1 \times 10^9$ $\Omega \cdot cm$. More preferably, the lower limit is $1 \times 10^2$ $\Omega \cdot cm$ and the upper limit is $1 \times 10^8$ $\Omega \cdot cm$.

In addition to the fillers, optional additives such as heat stabilizers, stiffeners, UV absorbers, and pigments may be added.

The laminate of the present invention is produced by lamination of the rubber layer (A) and the fluororesin layer (B). In the laminate of the present invention, the rubber layers (A) may be laminated on both faces of the fluororesin layer (B). Or alternatively, the fluororesin layers (B) may be laminated on both faces of the rubber layer (A).

Lamination of the rubber layer (A) and the fluororesin layer (B) may be carried out by any method such as a method of laminating the rubber layer (A) and the fluororesin layer (B), which have been separately formed, by pressure bonding and the like, a method of laminating the rubber layer (A) and the fluororesin layer (B) by simultaneously forming the both layers, and a method of applying the fluororesin layer (B) composition to the rubber layer (A).

In the method of laminating the rubber layer (A) and the fluororesin layer (B), which have been separately formed, by pressure bonding and the like, different methods may be employed to form layers for the fluoropolymer and the rubber composition for vulcanization.

Formation of the rubber layer (A) may be carried out by shaping the rubber composition for vulcanization into various shapes such as a sheet and a tube by heat compression molding, transfer molding, extrusion, injection, calendering, coating, or the like.

The fluororesin layer (B) may be formed by heat compression molding, melt-extrusion molding, injection, coating (including powder coating), or the like. Forming may be carried out by using a common forming machine for fluoropolymers such as an injection machine, a blow molding machine, an extrusion machine, and various coating machines. With such a machine, it is possible to produce laminates having various shapes such as a sheet and a tube. Among these methods, melt-extrusion molding is preferable because of its excellent productivity.

As later described, in the case where another polymer layer (C) is laminated on the fluororesin layer (B), a forming method such as multilayer extrusion, multilayer blow molding, and multilayer injection may be employed to produce multilayer molded products such as multilayer tubes, multilayer hoses, and multilayer tanks.

Examples of the method of laminating the rubber layer (A) and the fluororesin layer (B) by simultaneously forming the both layers include a method of forming and laminating the layers at the same time with use of the rubber composition for vulcanization for forming the rubber layer (A) and the fluoropolymer (b1) for forming the fluororesin layer (B) by a method such as multilayer compression molding, multilayer transfer molding, multilayer extrusion, multilayer injection, or doubling. In such a method, the rubber layer (A) as an unvulcanized formed body and the fluororesin layer (B) are formed and laminated at the same time. Thus, a treatment for firmly adhering the rubber layer (A) and the fluororesin layer (B) is not needed and strong adhesion is advantageously obtained in the subsequent vulcanization step.

The laminate of the present invention may be a laminate of the unvulcanized rubber layer (A) and the fluororesin layer (B). Vulcanization of such an unvulcanized laminate gives strong interlayer adhesiveness.

In other words, the present invention also relates to a vulcanized laminate including a vulcanized rubber layer (A1) and the fluororesin layer (B) adhered to each other by vulcanization, which is obtained by vulcanizing the unvulcanized laminate of the present invention.

A conventionally known method and conditions for vulcanizing a rubber composition for vulcanization may be employed for vulcanizing the unvulcanized laminate. Exemplary methods include a method of vulcanizing an unvulcanized laminate over a long period of time and a method in which an unvulcanized laminate is first subjected to a heat treatment as a pretreatment for a comparatively short time (vulcanization being initiated during the pretreatment) and next to the vulcanization treatment over a long period of time. Especially, the method in which an unvulcanized laminate is first subjected to a heat treatment as a pretreatment for a comparatively short time and next to the vulcanization treatment over a long period of time is preferable for the following reasons. That is, adhesion between the rubber layer (A) and the fluororesin layer (B) is easily obtained in the pretreatment. Further, since vulcanization of the rubber layer (A) starts during the pretreatment and the shape thereof is stabilized, the laminate may be held in various ways during the subsequent vulcanization treatment.

Conditions of the vulcanization treatment are not particularly limited, and common conditions may be employed. Preferably, vulcanization is performed at 130° C. to 260° C. for 10 minutes to 80 hours by using steam, pressing, an oven, an air bath, infrared rays, microwave, lead sheathing vulcanization, and the like. More preferably, vulcanization is performed at 160° C. to 230° C. for 20 minutes to 80 hours.

Also, heating conditions during the pretreatment are not particularly limited. Preferably, the pretreatment is performed at 100° C. to 170° C. for 30 seconds to 1 hour by using steam, pressing, an oven, an air bath, infrared rays, microwave, lead sheathing vulcanization, and the like.

In the vulcanized laminate obtained, the vulcanized rubber layer (A1) and the fluororesin layer (B) are adhered to each other by vulcanization, and the interlayer adhesion between them is strong.

The laminates of the present invention (both the unvulcanized laminate and the vulcanized laminate) each may have a two-layer structure having a rubber layer (A and A1: hereinafter, represented by rubber layer (A)) and the fluororesin layer (B), or a three-layer structure having layers of (A)-(B)-(A) or (B)-(A)-(B). Moreover, it may have a multilayer structure having three or more layers in which a polymer layer (C) other than the rubber layer (A) and the fluororesin layer (B) are further adhered.

The polymer layer (C) may be a rubber layer (C1) other than the rubber layer (A), a resin layer (C2) other than the fluororesin layer (B), or a fiber reinforced layer. In addition, the rubber layer (A) and/or the fluororesin layer (B) may be further laminated by interposing the polymer layer (C).

The rubber layer (C1) is made of a rubber other than the rubber used in the rubber layer (A) that is directly adhered to the fluororesin layer (B), and the rubber may be a fluororubber or a fluorine-free rubber. Specifically, the previously mentioned examples of the unvulcanized rubber (a1) may be used.

Here, the vulcanizing agent (a6) or other compounding agents may be added also to the unvulcanized rubber composition for forming the rubber layer (C1).

The resin layer (C2) may be made of a resin having excellent mechanical strength or a resin having low fuel/gas permeability (hereinafter, also referred to as low-permeable resins). Specific examples of the resin having excellent mechanical strength include fluororesins (other than the fluororesin (B)), polyamide resins, polyolefin resins, vinyl chloride resins, polyurethane resins, polyester resins, polyaramide resins, polyimide resins, polyamideimide resins, polyphenylene oxide resins, polyacetal resins, polycarbonate resins, acrylic resins, styrene resins, acrylonitrile/butadiene/styrene resins (ABS), cellulose resins, polyetheretherketone resins (PEEK), polysulfone resins, polyethersulfone resins (PES), and polyetherimide resins. Specific examples of the resin having low fuel/gas permeability include resins containing ethylene/vinyl alcohol copolymers, polyphenylene sulfide resins, polybutylene naphthalate resins, polybutylene terephthalate resins, and polyphthalamide (PPA). Among these, polyamide resins are preferable because of their favorable formability and adhesiveness. In the case where a laminate is subjected to vulcanization treatment, the melting point of the resin is preferably higher than the temperature of the heat treatment.

Next, the layer structure of the laminate of the present invention is described.

(1) Two-Layer Structure Including Rubber Layer (A)-Fluororesin Layer (B)

This structure is a basic structure. As described above, interlayer adhesion (fluororesin layer-rubber layer) in such a structure is insufficient. Therefore, the additional steps such as a surface treatment on the resin side, additional application of an adhesive between the layers, and fixation by wrapping with a film in a tape form have been conventionally employed for adhesion of the rubber layer (A) and the fluororesin layer (B), and this has made the procedure complicated. However, according to the present invention, adhesion by vulcanization provides a chemically strong adhesion.

(2) Three-Layer Structure Including Rubber Layer-Fluororesin Layer (B)-Rubber Layer This structure may have layers of (A)-(B)-(A) or (A)-(B)-(C1). In the case where sealability is needed, rubber layers are preferably arranged on both sides of the fluororesin layer (B), for example, at a joint part of a fuel pipe or the like for maintaining the sealability. The rubber layers of the outer and inner layers may be the same as or different from each other.

A fuel pipe is allowed to have enhanced chemical resistance and lower fuel permeability by employing the (A)-(B)-(C1) structure in which the rubber layer (A) is a fluorine-free rubber layer, the rubber layer (C1) is a fluororubber layer, and the fluororubber layer (C1) is an inner layer of the pipe.

(3) Three-Layer Structure Including Resin Layer-Rubber Layer (A)-Resin Layer

This structure may have layers of (B)-(A)-(B) or (B)-(A)-(C2).

The rubber layers of the outer and inner layers may be the same as or different from each other.

The resin layers arranged on the both sides stabilize the shape. In addition, such a structure is favorable in the case where the chemical resistance is important. Moreover, in the case where different mechanical properties are required on respective sides, the structure may have layers of (B)-(A)-(C2).

(4) Three-Layer Structure Including Resin Layer (C2)-Fluororesin Layer (B)-Rubber Layer (A).

(5) Three Layer Structure Including Fluororesin Layer (B)-Rubber Layer (A)-Rubber Layer (C1)

(6) Four or More Layer Structure

Onto the three-layer structures of (2) to (5), an optional rubber layer (A) or (C1), a resin layer (B) or (C2) may be laminated in accordance with the purpose thereof. Further, a layer of a metal foil and the like may be laminated and an adhesive layer may be interposed between the layers except for the rubber layer (A)-fluororesin layer (B) part.

Moreover, a polymer layer (C) may be further laminated to allow a laminate to be a lining.

Here, the thickness, shape and the like of each layer may be appropriately determined in accordance with the purpose and usage patterns.

The laminate of the present invention, especially a vulcanized laminate, has sufficiently low fuel permeability and has excellent heat resistance, oil resistance, fuel resistance, LLC resistance, and steam resistance. Additionally, such a laminate can withstand applications under severe conditions so as to be applicable in various usages.

For example, the laminate of the present invention is favorably used for seals, bellows, diaphragms, hoses, tubes, and electric cables of gaskets and non-contact and contact type packings (self-seal packing, piston ring, split ring packing, mechanical seal, oil seal, and etc.) which are required to have heat resistance, oil resistance, fuel resistance, LLC resistance, and steam resistance. They are used for engine body, main engine-driving system, valve gear system, lubricating/cooling system, fuel system, and intake/exhaust system; transmission system of driving gear system; steering system of chassis; braking system; standard electrical parts, electrical parts for control, and accessory electrical parts for automobiles.

Specifically, the laminate of the present invention is usable for the following applications.

In the basic engine, gaskets such as cylinder head gasket, cylinder head covering gaskets, oil pan packing, and general gaskets; seals such as O-rings, packing, and timing belt covering gaskets; hoses such as control hoses; engine mount rubber cushions, and sealing materials for high pressure valves in hydrogen storage systems.

Shaft seals such as crankshaft seal and camshaft seal in the main driving system.

Valve stem seals of engine valves in the valve gear system.

Engine oil cooler hoses, oil return hoses, and seal gaskets of engine oil coolers; water hoses around radiators; vacuum pump oil hoses of the vacuum pumps, in the lubrication/cooling system.

Oil seals, diaphragms, and valves of the fuel pumps; fuel hoses such as filler (neck) hoses, fuel supply hoses, fuel return hoses, and vapor (evaporator) hoses; in-tank hoses, filler seals, tank packing, in-tank fuel pump mounting of fuel tanks; tubes and connector O-rings of the fuel line tubes; injector cushion rings, injector sealer rings, injector O-rings, pressure regulator diaphragms, and check valves of fuel injectors; needle valves, accelerating pump pistons, flange gaskets, controlling hoses of carburetors; and valve sheets and diaphragms of combined air control (CAC), in the fuel system.

Intake manifold packing and exhaust manifold packing of manifolds; diaphragms, control hoses, and emission control hoses of EGR (Exhaust gas recirculation); diaphragms of BPT; anti-afterburn valve sheets of AB valves; throttle body packing of throttles; turbo oil hoses (supply), turbo oil hoses (return), turbo air hoses, inter cooler hoses, and turbine shaft seals of turbo chargers, in the intake/exhaust system.

Bearing seals, oil seals, O-rings, packing, tor-con hoses related to transmissions system; mission oil hoses, ATF hoses, O-rings, and packing of AT in the transmission system.

Power steering oil hoses in the steering system.

Breather valves, vacuum valves, and diaphragm of master vacs, piston cups (rubber cups) of master cylinders, oil seals, O-rings, packing, brake fluid hoses, caliper seals, and boots, in the braking system.

Insulation bodies and sheaths of electric cables (harness), and tubes of harness exterior parts, of basic electrical components.

Covering materials for various sensor cables in the control electrical components.

O-rings, packing, and cooler hoses of car air conditioners, wiper blades of exterior equipment, as the equipment electrical components.

Suitable applications other than automotive applications include: packing, O-rings, hoses, other sealing materials, diaphragms, valves for achieving oil resistance, chemical resistance, heat resistance, steam resistance, or weather resistance in transportation system such as marine vessels and aircrafts; similar packing, O-rings, sealing materials, diaphragms, valves, hoses, rolls, tubes, chemical resistant coatings, and linings in chemical plants; similar packing, O-rings, hoses, sealing materials, belts, diaphragms, valves, rolls, and tubes in food plant equipment and food equipment (including household goods); similar packing, O-rings, hoses, sealing materials, diaphragms, valves, and tubes in nuclear plant equipment; similar packing, O-rings, hoses, sealing materials, diaphragms, valves, rolls, tubes, linings, mandrels, electric cables, flexible joints, belts, rubber plates, weather strips, roll blades in PPC copiers, in common industrial goods. For example, backup rubber materials of a PTFE diaphragm has been problematically worn out or torn during use because of its poor slippage. However, the laminate of the present invention can solve such a problem and is favorably used.

In use as rubber sealing materials for food, the conventional rubber sealing materials problematically have aromatizing properties and rubber chips may be immixed in food. However, the laminate of the present invention can solve such problems and is favorably used. A rubber material is problematically swollen when used as a sealing material for piping that uses a solvent for rubber sealing materials for medical and chemical application. However, use of the laminate of the present invention in which rubber is coated with the resin can solve such a problem. In common industrial field, the laminate of the present invention is favorably used in rubber rolls, O-rings, packing, sealing materials, and the like, with an aim of enhancing the strength, slippage, chemical resistance, and permeability of the rubber material. Especially, the laminate of the present invention is favorably used in packing of lithium ion batteries as it can maintain the chemical resistance and the sealing property at the same time. Additionally, the laminate of the present invention is favorably used in applications requiring the sliding property by low friction.

Among these, the laminate of the present invention is preferably used for fuel pipes in terms of heat resistance and low fuel permeability. In other words, the present invention also relates to a fuel pipe formed using the laminate.

Fuel pipes made of the laminate of the present invention may be produced by a common method and the method is not particularly limited. The fuel pipes in the present invention include a corrugate tube.

EXAMPLES

The present invention is now described with reference to examples, but is not limited only to these examples.

Hereinafter, fluororesins used in examples and comparative examples and evaluation methods thereof are described.
(1) Composition of Polymer The composition was measured by $^{19}$F-NMR analysis.
(2) Melting Point The melting point was obtained as a temperature corresponding to the maximum value of the melting peaks measured by a SEIKO DSC device (product of Seiko Instruments Inc.) when the temperature was increased at 10° C./min.
(3) MFR (Melt Flow Rate)

The MFR was obtained by measuring the weight (g) of the polymer exiting from the nozzle having a diameter of 2 mm and a length of 8 mm per unit time (10 minutes) under a load of 5 kg at various temperatures with use of a melt indexer (product of TOYO SEIKI SEISAKU-SHO, LTD.).
(4) Measurement of Fuel Permeability Coefficient of Monolayer Resin pellets were each placed in a die having a diameter of 120 mm and set in a press machine heated to 300° C. The pellets were respectively molten and pressed at a pressure of about 2.9 MPa to give sheets having a thickness of 0.15 mm. The sheets were each placed in a SUS 316 cup for the fuel permeability coefficient measurement (40 mm$\phi$ of internal diameter, 20 mm of height) containing 18 mL of CE 10 (fuel containing a mixture of isooctane:toluene=50:50 (volume ratio) blended with 10% by volume of ethanol). The mass change was measured at 60° C. for 1000 hours. Based on the time rate of the measured mass change and the surface area and thickness of the sheet in a wetted part, the fuel permeability coefficient (g·mm/m$^2$/day) was calculated.

Synthesis Example 1 (Fluororesin (1))

A jacketed polymerization vessel equipped with a stirrer and having a capacity of 174 kg of water was charged with 51.5 kg of demineralized pure water, the gaseous phase inside the vessel was sufficiently substituted with pure nitrogen gas, and the nitrogen gas was then removed by evacuation. Then, 40.6 kg of octafluorocyclobutane, 1.3 kg of chlorotrifluoroethylene (CTFE), 4.5 kg of tetrafluoroethylene (TFE), and 2.8 kg of perfluoro(propyl vinyl ether) (PPVE) were fed into the vessel under pressure. n-Propyl alcohol (PrOH) (0.075 kg) was added as a chain transfer agent, the temperature was adjusted to 35° C., and stirring was started. Thereto was added 0.44 kg of a 50% (by mass) solution of di-n-propyl peroxydicarbonate (NPP) in methanol as a polymerization initiator to start the polymerization. During the polymerization, a monomer mixture prepared so as to have the same composition (monomer ratio) as the desired copolymer composition was additionally fed to maintain the pressure inside the vessel at 0.66 MPa. After the polymerization, the residual gas in the vessel was discharged by evacuation, and the polymer formed was taken out, washed with demineralized pure water, and dried to give 30.5 kg of a CTFE copolymer as a granular powder. The copolymer was then melt-kneaded on a $\phi$50 mm single screw extruder at a cylinder temperature of 290° C. to give pellets. The CTFE copolymer obtained in the form of pellets was then heated at 205° C. for 8 hours. Table 2 shows the properties of the resulting polymer. The number of functional groups for each $10^6$ of carbon atoms in the main chain was 180.

Synthesis Example 2 (Synthesis of the Fluororesin (2))

A jacketed polymerization vessel equipped with a stirrer and having a capacity of 174 kg of water was charged with 51.5 kg of demineralized pure water, the gaseous phase inside the vessel was sufficiently substituted with pure nitrogen gas, and the nitrogen gas was then removed by evacuation. Then, 40.6 kg of octafluorocyclobutane, 2.0 kg of chlorotrifluoroethylene (CTFE), 6.6 kg of tetrafluoroethylene (TFE), and 4.2 kg of perfluoro(propyl vinyl ether) [PPVE] were fed into the vessel under pressure. n-Propyl alcohol (PrOH) (0.098 kg) was added as a chain transfer agent, the temperature was adjusted to 35° C., and stirring was started. Thereto was added 0.13 kg of a 50% (by mass) solution of di-n-propyl peroxydicarbonate (NPP) in methanol as a polymerization initiator to start the polymerization. During the polymerization, a monomer mixture prepared so as to have the same composition (monomer ratio) as the desired copolymer composition was additionally fed to maintain the pressure inside the vessel at 0.80 MPa. After the polymerization, the residual gas in the vessel was discharged by evacuation, and the polymer formed was taken out, washed with demineralized pure water and dried to give 30.5 kg of a CTFE copolymer as a granular powder. The copolymer was then melt-kneaded on a φ50 mm single-screw extruder at a cylinder temperature of 320° C. to give pellets. The CTFE copolymer obtained in the form of pellets was then heated at 190° C. for 12 hours. Table 2 shows the properties of the resulting polymer. The number of functional groups for each $10^6$ of carbon atoms in the main chain was 30.

Table 2 shows fluororesins used in examples and comparative examples.

TABLE 2

| Fluoropolymer | | Melting point (° C.) | MFR (g/10 min.) (Measurement temperature) | Fuel permeability (g · mm/m²/day) | Thickness of fluororesin sheet (μm) |
|---|---|---|---|---|---|
| Fluororesin (1) | CTFE/TFE/PPVE copolymer 21.3/76.3/2.4 (mol %) | 246 | 29.2 (297° C.) | 0.4 | 120 |
| Fluororesin (2) | CTFE/TFE/PPVE copolymer 21.3/76.3/2.4 (mol %) | 246 | 3 (297° C.) | 0.4 | 120 |

(Rubber Compositions A to J and a to e for Vulcanization)

Materials shown in Table 3 were separately compounded using a 8-inch open roll mixer to give rubber compositions A to J and a to e for vulcanization in a sheet shape having a thickness of about 3 mm. Numerical values in Table 3 are each expressed in units of part by mass.

A maximum torque value ($M_H$) and a minimum torque value ($M_L$) at 160° C. were measured using a curelastometer type II (model: JSR curelastometer, product of JSR Trading Co., Ltd.) for each of the rubber compositions A to J and a to e for vulcanization. Based on the measurement, the induction time ($T_{10}$) and the optimal vulcanizing time ($T_{90}$) were calculated. $M_H$ and $M_L$ were measured in conformity with JIS K 6300-2. Table 4 shows the measurement results.

TABLE 3

| Category of compounding ingredients | Product name | Maker | Rubber composition for vulcanization |||||||||
|---|---|---|---|---|---|---|---|---|---|---|
| | | | A | B | C | D | E | F | G | H |
| Base polymer | Nipol DN101 | ZEON CORPORATION | 100.0 | 100.0 | 100.0 | 100.0 | 100.0 | 100.0 | 100.0 | 100.0 |
| Stearic acid | Stearic acid 50S | New Japan Chemical Co., Ltd. | 1.0 | 1.0 | 1.0 | 1.0 | 1.0 | 1.0 | 1.0 | 1.0 |
| MgO | Kyowa Mag 150 | Kyowa Chemical Industry Co., Ltd. | 10.0 | 10.0 | 10.0 | 10.0 | 10.0 | 10.0 | 10.0 | 10.0 |
| DBU formate | SA-603 | San-Apro Ltd. | 1.0 | 1.0 | 1.0 | 1.0 | 1.0 | 0.5 | 0.5 | 0.5 |
| Carbon black | SEASTS | Tokai Carbon Co., Ltd. | 50.0 | 50.0 | 50.0 | 50.0 | 50.0 | 50.0 | 50.0 | 50.0 |
| Silica | Carplex 1120 | DSL Japan | 20.0 | 20.0 | 20.0 | 20.0 | 20.0 | 20.0 | 20.0 | 20.0 |
| Calcium sulfate dihydrate | — | Kishida Chemical Co., Ltd. | 5.0 | 20.0 | — | — | — | — | — | 20.0 |
| Calcium acetate monohydrate | — | Wako Pure Chemical Industries, Ltd. | — | — | — | — | — | 20.0 | — | — |
| Plasticizer | Thiokol TP-95 | Rohm and Haas | 20.0 | 20.0 | 20.0 | 20.0 | 25.0 | 25.0 | 25.0 | 25.0 |
| Sulfur | Sulfur powder | Hosoi Chemical Industry Co., Ltd. | 1.5 | 1.5 | 1.5 | 1.5 | 1.5 | 1.5 | 1.5 | 1.5 |
| Thiazole vulcanizing agent | NOCCELER MSA-G | OUCHI SHINKO CHEMICAL INDUSTRIAL CO., LTD. | 1.0 | 1.0 | 1.0 | 1.0 | 1.0 | 1.0 | 1.0 | 1.0 |
| Thiazole metal salt | NOCCELER MZ (ZnMBT) | OUCHI SHINKO CHEMICAL INDUSTRIAL CO., LTD. | 0.2 | 0.2 | 0.2 | 0.2 | 0.2 | 0.2 | 0.2 | 0.2 |
| Dithiocarbamic acid copper salts | NOCCELER TTCu | OUCHI SHINKO CHEMICAL INDUSTRIAL CO., LTD. | — | — | 0.3 | 1.0 | 1.0 | 1.0 | 3.0 | 3.0 |
| Dithiocarbamates | NOCCELER EZ | OUCHI SHINKO CHEMICAL INDUSTRIAL CO., LTD. | — | — | — | — | — | — | — | — |
| Dithiocarbamates | NOCCELER PZ | OUCHI SHINKO CHEMICAL INDUSTRIAL CO., LTD. | — | — | — | — | — | — | — | — |
| Dithiocarbamates | NOCCELER BZ | OUCHI SHINKO CHEMICAL INDUSTRIAL CO., LTD. | — | — | — | — | — | — | — | — |
| Amine-aldehyde compounds | NOCCELER 8 | OUCHI SHINKO CHEMICAL INDUSTRIAL CO., LTD. | — | — | — | — | — | — | — | — |

TABLE 3-continued

| Category of compounding ingredients | Product name | Maker | Rubber composition for vulcanization | | | | | | |
|---|---|---|---|---|---|---|---|---|---|
| | | | I | J | a | b | c | d | e |
| Base polymer | Nipol DN101 | ZEON CORPORATION | 100.0 | 100.0 | 100.0 | 100.0 | 100.0 | 100.0 | 100.0 |
| Stearic acid | Stearic acid 50S | New Japan Chemical Co., Ltd. | 1.0 | 1.0 | 1.0 | 1.0 | 1.0 | 1.0 | 1.0 |
| MgO | Kyowa Mag 150 | Kyowa Chemical Industry Co., Ltd. | 10.0 | 10.0 | 10.0 | 10.0 | 10.0 | 10.0 | 10.0 |
| DBU formate | SA-603 | San-Apro Ltd. | 0.5 | 0.2 | 1.0 | — | 0.5 | 0.5 | 0.5 |
| Carbon black | SEASTS | Tokai Carbon Co., Ltd. | 50.0 | 50.0 | 50.0 | 50.0 | 50.0 | 50.0 | 50.0 |
| Silica | Carplex 1120 | DSL Japan | 20.0 | 20.0 | 20.0 | 20.0 | 20.0 | 20.0 | 20.0 |
| Calcium sulfate dihydrate | — | Kishida Chemical Co., Ltd. | — | — | — | 20.0 | — | — | — |
| Calcium acetate monohydrate | — | Wako Pure Chemical Industries, Ltd. | — | — | — | — | — | — | — |
| Plasticizer | Thiokol TP-95 | Rohm and Haas | 25.0 | 25.0 | 20.0 | 20.0 | 25.0 | 25.0 | 25.0 |
| Sulfur | Sulfur powder | Hosoi Chemical Industry Co., Ltd. | 1.5 | 1.5 | 1.5 | 1.5 | 1.5 | 1.5 | 1.5 |
| Thiazole vulcanizing agent | NOCCELER MSA-G | OUCHI SHINKO CHEMICAL INDUSTRIAL CO., LTD. | 1.0 | 1.0 | 1.0 | 1.0 | 1.0 | 1.0 | 1.0 |
| Thiazole metal salt | NOCCELER MZ (ZnMBT) | OUCHI SHINKO CHEMICAL INDUSTRIAL CO., LTD. | 0.2 | 0.2 | 0.2 | 0.2 | 0.2 | 0.2 | 0.2 |
| Dithiocarbamic acid copper salts | NOCCELER TTCu | OUCHI SHINKO CHEMICAL INDUSTRIAL CO., LTD. | — | 3.0 | — | 1.0 | — | — | — |
| Dithiocarbamates | NOCCELER EZ | OUCHI SHINKO CHEMICAL INDUSTRIAL CO., LTD. | — | — | — | — | 3.0 | — | — |
| Dithiocarbamates | NOCCELER PZ | OUCHI SHINKO CHEMICAL INDUSTRIAL CO., LTD. | — | — | — | — | — | 3.0 | — |
| Dithiocarbamates | NOCCELER BZ | OUCHI SHINKO CHEMICAL INDUSTRIAL CO., LTD. | — | — | — | — | — | — | 3.0 |
| Amine-aldehyde compounds | NOCCELER 8 | OUCHI SHINKO CHEMICAL INDUSTRIAL CO., LTD. | 3.0 | — | — | — | — | — | — |

TABLE 4

| | Rubber composition for vulcanization | | | | | | | | | | | | | | |
|---|---|---|---|---|---|---|---|---|---|---|---|---|---|---|---|
| | A | B | C | D | E | F | G | H | I | J | a | b | c | d | e |
| $M_L$ (N) | 3.9 | 3.0 | 3.7 | 2.7 | 2.5 | 2.7 | 2.1 | 2.7 | 4.4 | 4.7 | 2.1 | 2.5 | 2.8 | 2.1 | 2.9 |
| $M_H$ (N) | 24.2 | 23.9 | 23.2 | 22.5 | 21.1 | 26.0 | 17.3 | 18.1 | 17.1 | 16.2 | 22.3 | 34.3 | 18.2 | 18.3 | 17.0 |
| $T_{10}$ (min) | 1.5 | 1.5 | 1.5 | 1.0 | 1.5 | 1.0 | 1.0 | 1.0 | 1.5 | 0.5 | 1.5 | 1.5 | 1.0 | 1.0 | 1.0 |
| $T_{90}$ (min) | 12.5 | 12.5 | 11.0 | 12.5 | 12.0 | 11.0 | 3.0 | 3.0 | 11.5 | 2.0 | 12.0 | 9.0 | 3.0 | 3.0 | 3.0 |

Examples 1 to 10 and Comparative Examples 1 to 5

A sheet (about 3 mm thick) of a rubber composition for vulcanization shown in Table 3 and a fluororesin sheet having a thickness shown in Table 2 were stacked with a fluororesin film (10 μm thick, product of Daikin Industries, ltd., trade name: Polyflon PTFE M731 skive film) having a width of about 10 to 15 mm interposed therebetween on one end portion. The stack was inserted into a die containing a metal spacer so as to make a sheet having a thickness of 2 mm, and was pressed at 160° C. for 45 minutes to give a sheet-shaped laminate.

The obtained laminate was cut into three sets of strip specimens (10 mm width×40 mm length) each with a grip that is a part where the fluororesin sheet is peeled. The adhesion strength of the specimens was measured by performing a peeling test at a tensile speed of 50 mm/min. at 25° C. using an autograph (product of Shimadzu Corporation, AGS-J 5 kN) in conformity with the method disclosed in DIS-K-6256 (Adhesion test of cross-linked rubber). The average value of the obtained data (N=3) was calculated and determined as the adhesion strength. Further, the detachment was observed and evaluated based on the following criteria. Table 5 shows the results.

(Evaluation of Adhesion)

Good: Material corruption of the rubber composition for vulcanization or the fluororesin occurred on the interface of the laminate to allow no detachment.

Poor: Detachment comparatively easily occurred on the interface of the laminate.

TABLE 5

| | Rubber composition for vulcanization | Fluororesin layer | Adhesion strength (N/cm) | Evaluation of adhesion |
|---|---|---|---|---|
| Example 1 | A | (1) | 23 | Good |
| | | (2) | 27 | Good |
| Example 2 | B | (1) | 24 | Good |
| | | (2) | 25 | Good |
| Example 3 | C | (1) | 22 | Good |
| | | (2) | 28 | Good |
| Example 4 | D | (1) | 26 | Good |
| | | (2) | 29 | Good |
| Example 5 | E | (1) | 27 | Good |
| | | (2) | — | — |
| Example 6 | F | (1) | 24 | Good |
| | | (2) | — | — |
| Example 7 | G | (1) | 28 | Good |
| | | (2) | 29 | Good |
| Example 8 | H | (1) | 26 | Good |
| | | (2) | — | — |
| Example 9 | I | (1) | 22 | Good |
| | | (2) | 21 | Good |
| Example 10 | J | (1) | 25 | Good |
| | | (2) | 27 | Good |
| Comparative Example 1 | a | (1) | 13 | Poor |
| | | (2) | 13 | Poor |
| Comparative Example 2 | b | (1) | <1.0 | Poor |
| | | (2) | <1.0 | Poor |

TABLE 5-continued

|  | Rubber composition for vulcanization | Fluororesin layer | Adhesion strength (N/cm) | Evaluation of adhesion |
|---|---|---|---|---|
| Comparative Example 3 | c | (1)<br>(2) | <1.0<br>— | Poor<br>— |
| Comparative Example 4 | d | (1)<br>(2) | <1.0<br>— | Poor<br>— |
| Comparative Example 5 | e | (1)<br>(2) | <1.0<br>— | Poor<br>— |

Example 11

The rubber composition for vulcanization and the fluororesin were continuously extruded using an extrusion machine. Here, the inner-layer material was the rubber composition A for vulcanization, the middle-layer material was the fluororesin (1), and the outer-layer material was the rubber composition A for vulcanization. A DAITEPIC mandrel (product of Mitsubishi Cable Industries, Ltd.) having a diameter of 24.4 mm was used as a core material passed along with the materials through the forming line. The molded product obtained by extruding the rubber composition A for vulcanization and the fluororesin (1) was steam-vulcanized in a vulcanizing autoclave to give a fuel hose having the above three-layer structure. In addition, CE10 was enclosed in the fuel hose and the permeation coefficient was determined based on the mass change at 60° C. The coefficient was 0.4 g/m$^2$·day.

Conditions for extrusion and for steam-vulcanization are listed below.
1) Setting of extrusion machine for inner-layer NBR and outer-layer NBR
Screw temperature: 60° C.
Cylinder 1: 70° C.
Cylinder 2: 70° C.
Head: 80° C.
Thickness of molded product: 2.4 mm (both inner layer and outer layer)
2) Setting of extrusion machine for middle-layer fluororesin
Cylinder 1: 260° C.
Cylinder 2: 265° C.
Cylinder 3: 270° C.
Shell clamp: 270° C.
Neck: 270° C.
Die: 270° C.
Head: 270° C.
Thickness of molded product: 0.15 mm
3) Condition for steam vulcanization of molded product
160° C.×60 minutes

INDUSTRIAL APPLICABILITY

The laminate of the present invention, especially the vulcanized laminate, is excellent, not only in low fuel permeability, but also in heat resistance, oil resistance, fuel resistance, LLC resistance, and steam resistance. They are favorably used for seals, bellows, diaphragms, hoses, tubes, and electric cables of gaskets and non-contact and contact type packings (self-seal packing, piston ring, split ring packing, mechanical seal, oil seal, and etc.) which are required to have heat resistance, oil resistance, fuel resistance, LLC resistance, and steam resistance. They are used for the engine body, main engine-driving system, valve gear system, lubricating/cooling system, fuel system, and intake/exhaust system; transmission system of driving gear system; steering system of chassis; braking system; standard electrical parts, electrical parts for control, and accessory electrical parts for automobiles.

The invention claimed is:
1. A laminate comprising:
a rubber layer (A); and
a fluororesin layer (B) laminated on the rubber layer (A),
the rubber layer (A) being formed of a rubber composition for vulcanization,
the rubber composition for vulcanization containing:
at least one unvulcanized rubber (a1) selected from the group consisting of acrylonitrile-butadiene rubber and its hydride;
at least one compound (a2) selected from the group consisting of 1,8-diazabicyclo(5.4.0)undec-7-ene, 1,8-diazabicyclo(5.4.0)undec-7-ene phenolate, and 1,8-diazabicyclo(5.4.0)undec-7-ene formate;
at least one compound (a3) selected from the group consisting of aldehyde-amine compounds and metal hydrates, the metal hydrates being at least one selected from the group consisting of calcium sulfate dihydrate and calcium acetate monohydrate;
magnesium oxide (a4); and
silica (a5),
the fluororesin layer (B) being formed of a fluoropolymer composition,
wherein the fluoropolymer composition contains a fluoropolymer (b1) which has the copolymer unit derived from chlorotrifluoroethylene in an amount of 15 to 25 mol % of the total amount of the copolymer unit derived from chlorotrifluoroethylene and the copolymer unit derived from tetrafluoroethylene,
wherein the amount of the unvulcanized rubber (a1) is 100 parts by mass relative to the respective amounts of the compound (a2), the metal hydrate, the magnesium oxide (a4) and the silica (a5),
the amount of the compound (a2) is 0.3 to 3.0 parts by mass based on 100 parts by mass of the unvulcanized rubber (a1),
the amount of the metal hydrate is 2.0 to 30.0 parts by mass based on 100 parts by mass of the unvulcanized rubber (a1),
the amount of the magnesium oxide (a4) is 3 to 20 parts by mass based on 100 parts by mass of the unvulcanized rubber (a1),
the amount of the silica (a5) is 10 to 40 parts by mass based on 100 parts by mass of the unvulcanized rubber (a1),
wherein the fluoropolymer (b1) is a perhalopolymer that is a copolymer consisting essentially of chlorotrifluoroethylene, tetrafluoroethylene, and perfluoro(alkylvinylether),
wherein the perfluoro(alkylvinylether) is perfluoro(propylvinylether), and
wherein the total amount of the copolymer unit derived from chlorotrifluoroethylene and the copolymer unit derived from tetrafluoroethylene is 90 to 99.9 mol % of all the monomer units.
2. The laminate according to claim 1,
wherein the rubber composition for vulcanization further contains at least one vulcanizing agent (a6) selected from the group consisting of sulfur vulcanizing agents and peroxide vulcanizing agents.
3. The laminate according to claim 1,
wherein the rubber composition for vulcanization further contains a thiazole metal salt (a7).

4. The laminate according to claim 1,
wherein the fluoropolymer (b1) is a chlorotrifluoroethylene-tetrafluoroethylene-perfluoro(alkylvinylether) copolymer.

5. The laminate according to claim 1,
wherein the rubber layer (A) is laminated on each side of the fluororesin layer (B).

6. The laminate according to claim 1,
wherein the fluororesin layer (B) is laminated on each side of the rubber layer (A).

7. The laminate according to claim 1, further including, on the rubber layer (A) or the fluororesin layer (B), a polymer layer (C) other than the rubber layer (A) and the fluororesin layer (B).

8. A laminate prepared by vulcanizing the laminate according to claim 1,
wherein the rubber layer (A) and the fluororesin layer (B) are adhered to each other by vulcanization.

* * * * *